Nov. 24, 1936.  A. L. LAW  2,061,631
PLANT PROTECTOR AND SOIL RETAINER
Filed Aug. 11, 1936
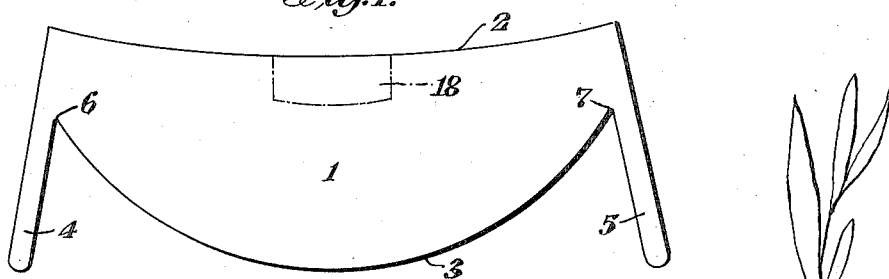
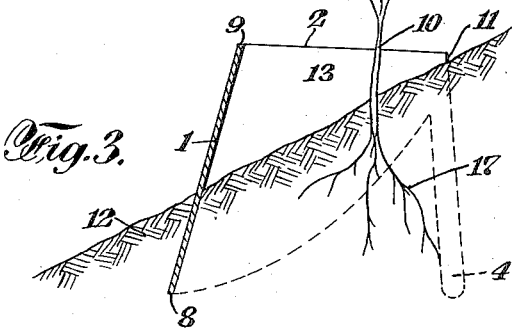
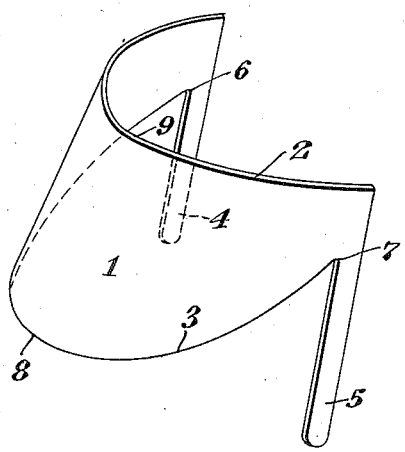
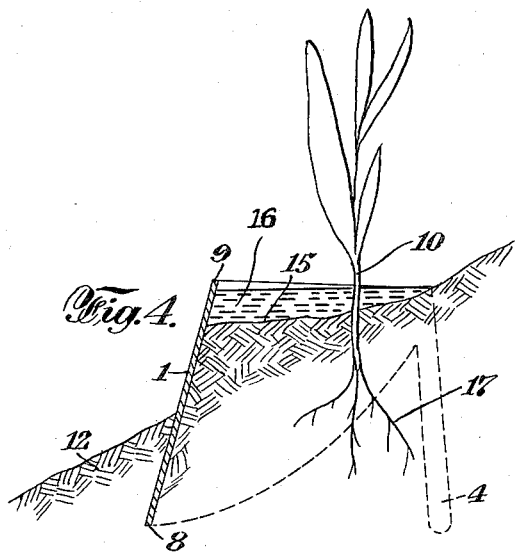
INVENTOR
ALFRED L. LAW
BY
ATTORNEYS Patented Nov. 24, 1936

2,061,631

UNITED STATES PATENT OFFICE 2,061,631

PLANT PROTECTOR AND SOIL RETAINER

Alfred L. Law, White Plains, N. Y.

Application August 11, 1936, Serial No. 95,313

5 Claims. (Cl. 47—30)

This invention pertains to a plant and root protector of simple and economical construction, which is capable of being cheaply produced in quantity, which is adapted for compact quantity packing for shipment, and which acts as a soil retainer and serves to protect the roots of plants, trees, etc., against soil erosion, to protect the plant and roots against injury during weeding and cultivating, and attack by earth vermin, etc., which fosters plant growth by retention of water about the plant after watering, which assists in providing a neat and well ordered bed, which provides an easy means of locating and identifying young plants, and which has other advantageous features of similar nature.

It is known to provide shields about small plants for protecting the portion thereof above ground against wind and exposure. Such shields are, however, intended primarily to house, enclose and protect only the exposed portions of young plants, and to this end are in general supported above ground on prongs or the like or are provided with flaps or edges supported substantially by the earth's surface. Such protectors, which are ordinarily made of paper, sometimes impregnated to resist weathering and germs, are not adapted by virtue of their fragility and mode of use, to serve the objects above noted of the present invention, namely, the prevention of soil erosion, injury of the plant during cultivation, retention of earth and water about the roots, etc.

The present invention provides a form of protector which, contrary to those heretofore known, is intended to be embedded in part directly in the earth and to be thus wholly supported thereby, and which is of such shape and composed of a material of such imperviousness, strength, stiffness and resistance to corrosion and rust, as to serve primarily to permanently retain earth and water about the plant, rather than to protect the exposed portions of the plant against wind and exposure. Especially in the case of plants located on hillsides, it becomes essential to protect them against soil erosion about the stem and roots, such as occurs during rainstorms, as well as against the rapid loss of earth moisture thereafter.

The present invention is ideally adapted for the purposes stated and to this end comprises a shield composed of a single sheet of stiff preferably substantially impervious material, at least the surface of which is resistant to corrosion and rust, and which is either preformed or is bendable preferably into the approximate shape of a conical sector, the lower edge of which is of irregular contour to facilitate thrusting the same directly into the earth either partially or wholly about the plant.

In accordance with a preferred form, the upper edge of the shield when bent about the plant is substantially flat viewed in elevation, the lower edge being however of pronounced convex curvature and being provided at the lateral edges with downwardly projecting prongs. The shield has thus somewhat the appearance of the familiar form of eye shade. It may be made of any appropriate material resistant to corrosion, rust, weathering and attack by vermin, such as tin or zinc coated sheet steel, painted or lacquered metal, organic media such as celluloid, Bakelite, etc., fibrous material, impregnated paper cardboard, or even glass and pottery.

Referring now to the drawing:

Fig. 1 shows in plan view a preferred configuration of the shield as made from a flexible material and prior to bending;

Fig. 2 is a perspective view of the shield after bending into the approximate contour of a conical sector in readiness for embedding the same in the earth about a plant;

Fig. 3 is a longitudinal section of the shield as partially embedded in the earth on the downhill side of a plant to protect the same against soil erosion, etc.; while Fig. 4 is a view similar to Fig. 3 illustrative of the manner in which the shield acts to catch and retain about the plant, soil and water which would otherwise be washed away during watering.

Referring to Fig. 1, the shield 1 is preferably stamped in quantity along with others, out of flat flexible sheet material, such as tinned plate, etc., in which event the upper edge 2 is made slightly concave, the lower edge 3 having a pronounced convex curvature and extending between a pair of prong-like members 4, 5 extending divergently downward considerably below the points 6, 7 at which the lower edge 3 joins the same.

Referring to Fig. 2, the shield 1 is, prior to use, bent preferably into the contour of a conical surface with the result that the upper edge 2 becomes substantially horizontal when viewed in elevation. The lower edge 3 by virtue of its initial curvature and the added curvature due to bending, presents at 8 a relatively sharp peak which together with prongs 4 and 5, provide a tripodlike support whereby by manually gripping the shield as at 9, it may be pressed easily into the earth about a plant in the manner illustrated in Fig. 3.

Referring to Fig. 3, if the plant 10 is located on sloping ground as illustrated at 11, at least one shield is thrust into the earth 12 on the downhill side of the plant, as shown, in order to prevent soil erosion and to retain the soil and water thereabout. If the earth's surface has the initial contour of 11, the shield is partially embedded in the earth to about the extent shown, leaving an enclosed space such as 13 above the ground, so that when the plant is subsequently watered, the earth and water washed down past the plant will be caught by the shield and thus retained, and the earth built up to a substantially level surface about the plant, in the fashion illustrated at 15 in Fig. 4. Likewise, after watering, water will be retained for some considerable time about the plant about as indicated at 16, so that the shield will act as a small reservoir supplying moisture gradually and as needed to the plant roots 17 and the earth thereabout.

If it is desired to fully protect the plant against the ravages of earth vermin, such as cut-worms, etc., one or a number of shields may be so bent and embedded as to completely surround the plant with the upper edge or edges of the shields projecting considerably above the ground line as in Fig. 3.

The shield itself, owing to its size and appearance, serves as an easy means for identifying the location of young plants. If it is desired further to permanently record the type of plant, this may be done by providing the shield with a white or light surfaced portion, such as 18, Fig. 1, on the upper exposed surface on which the record is entered.

What I claim is:

1. A shield for protecting plants, trees and the like against soil erosion and loss of water about the roots, attack by vermin, and injury during cultivation, comprising a single relatively thin-walled piece of stiff and lasting material, said sheet having the approximate contour of a conical sector, the lower edge of which is of irregular contour to facilitate thrusting the shield in part directly into the earth about a plant, thereby to retain soil and water about the roots and to protect the plant as aforesaid.

2. A shield for protecting plants, trees and the like against soil erosion and loss of water about the roots, attack by vermin, and injury during cultivation, comprising a single sheet of stiff and lasting material bendable into the approximate contour of a conical sector having a smooth upper edge and a lower edge which is of irregular contour to facilitate thrusting the shield in part directly into the earth about a plant thereby to retain soil and water about the roots and to protect the plant as aforesaid.

3. A shield for protecting plants, trees and the like against soil erosion and loss of water about the roots, attack by vermin, and injury during cultivation, comprising a single sheet of stiff material, at least the surface of which is non-corrodible, said sheet being bendable into the approximate contour of a conical sector having a smooth outer edge and a lower edge of irregular contour to facilitate thrusting the shield in part directly into the earth about a plant thereby to retain soil and water about the roots and to protect the plant as aforesaid.

4. A shield for protecting plants, trees and the like against soil erosion and loss of water about the roots, attack by vermin, and injury during cultivation, comprising a single sheet of metal, at least the surface of which is non-corrodible and rust proof, said sheet being bendable into the approximate contour of a conical sector having a lower edge of irregular contour to faciiltate thrusting the shield in part directly into the ground thereby to retain soil and water about the roots and to protect the plant as aforesaid.

5. A shield for protecting plants, trees and the like against soil erosion and loss of water about the roots, attack by vermin, and injury during cultivation, comprising a single sheet of stiff, flexible material at least the surface of which is non-corrodible, said shield being bendable into the approximate contour of a conical sector and having a slightly concave upper edge, a lower edge of pronounced convex curvature terminating in a pair of prong-like members extending below said terminations to facilitate thrusting said shield in part directly into the earth about a plant, thereby to retain soil and water about the roots and to protect the plant as aforesaid.

ALFRED L. LAW.